(12) United States Patent
Chang et al.

(10) Patent No.: US 9,313,048 B2
(45) Date of Patent: Apr. 12, 2016

(54) LOCATION AWARE VIRTUAL SERVICE PROVISIONING IN A HYBRID CLOUD ENVIRONMENT

(75) Inventors: David Chang, Milpitas, CA (US); Abhijit Patra, Saratoga, CA (US); Nagaraj Bagepalli, Fremont, CA (US); Murali Anantha, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 340 days.

(21) Appl. No.: 13/438,861

(22) Filed: Apr. 4, 2012

(65) Prior Publication Data

US 2013/0268588 A1    Oct. 10, 2013

(51) Int. Cl.
*G06F 15/16* (2006.01)
*H04L 12/64* (2006.01)

(52) U.S. Cl.
CPC .................................. *H04L 12/6418* (2013.01)

(58) Field of Classification Search
CPC ..... H04L 67/306; H04L 67/327; H04L 12/66; H04L 47/10; H04L 41/085; H04L 45/70; H04L 47/2416; H04L 47/2408; H04L 47/2441; H04L 47/32; H04L 49/90; H04L 12/2602
USPC ......................................................... 709/204
See application file for complete search history.

(56) References Cited

U.S. PATENT DOCUMENTS

| | | | |
|---|---|---|---|
| 7,277,948 B2 * | 10/2007 | Igarashi et al. | 709/227 |
| 8,296,434 B1 * | 10/2012 | Miller et al. | 709/226 |
| 8,931,038 B2 * | 1/2015 | Pulier et al. | 726/1 |
| 2008/0049786 A1 * | 2/2008 | Ram et al. | 370/468 |
| 2009/0323706 A1 * | 12/2009 | Germain et al. | 370/401 |
| 2011/0131275 A1 * | 6/2011 | Maida-Smith | H04L 63/20 709/204 |
| 2011/0255538 A1 * | 10/2011 | Srinivasan et al. | 370/392 |

(Continued)

FOREIGN PATENT DOCUMENTS

| | | |
|---|---|---|
| CN | 102067533 A | 5/2011 |
| CN | 102255933 A | 11/2011 |

OTHER PUBLICATIONS

Extended European Search Report in counterpart European application No. 13160038.9, mailed Aug. 16, 2013, 7 pages.

(Continued)

*Primary Examiner* — Kevin Bates
*Assistant Examiner* — Sm Rahman
(74) *Attorney, Agent, or Firm* — Edell, Shapiro & Finnan, LLC

(57) ABSTRACT

A sense of location is provided for distributed virtual switch components into the service provisioning scheme to reduce latency observed in conducting policy evaluations across a network in a hybrid cloud environment. A management application in a first virtual network subscribes to virtual network services provided by a second virtual network. A first message is sent to the second virtual network, the first message comprising information configured to start a virtual switch in the second virtual network that switches network traffic for one or more virtual machines in the second virtual network that are configured to extend services provided by the first virtual network into the second virtual network. A second message is sent to the second virtual network, the second message comprising information configured to start a virtual service node in the second virtual network that provides network traffic services for the one or more virtual machines.

23 Claims, 7 Drawing Sheets

(56) References Cited

U.S. PATENT DOCUMENTS

2012/0158928 A1* 6/2012 Naddeo ............... G06F 8/61
                                              709/221
2012/0222084 A1* 8/2012 Beaty et al. ............... 726/1

OTHER PUBLICATIONS

CISCO, "Best practices in Deploying Cisco Nexus 1000V Series Switches on Cisco UCS B and C Series Cisco UCS Manager Servers," Cisco White Paper, Apr. 2011, retrieved from http://www.cisco.com/en/US/prod/collateral/switches/ps9441/ps9902/white_paper_c11-558242.pdf, on Aug. 2, 2013, 36 pages.

CISCO, "Cisco Unified Network Services: Overcome Obstacles to Cloud-Ready Deployments," Cisco White Paper, retrieved from http://www.cisco.com/en/US/solutions/collateral/ns340/ns517/ns224/ns836/ns976/white_paper_C11-64521.pdf, on Aug. 2, 2013, 6 pages.

AdventNet, "CORBA Northbound Tutorial," Web NMS 4, Release 4.7.0, AdventNet, Inc.,1996-2002.

IDC, White Paper, "Architecting the Network for the Cloud," Jan. 2011.

Cisco Systems, Inc., VMware, Inc., "Joint Cisco and VMware® Solution for Optimizing Virtual Desktop Delivery," 2008.

First Office Action in counterpart Chinese Application No. 201310116263.4, Issued Dec. 3, 2015, 13 pages.

* cited by examiner

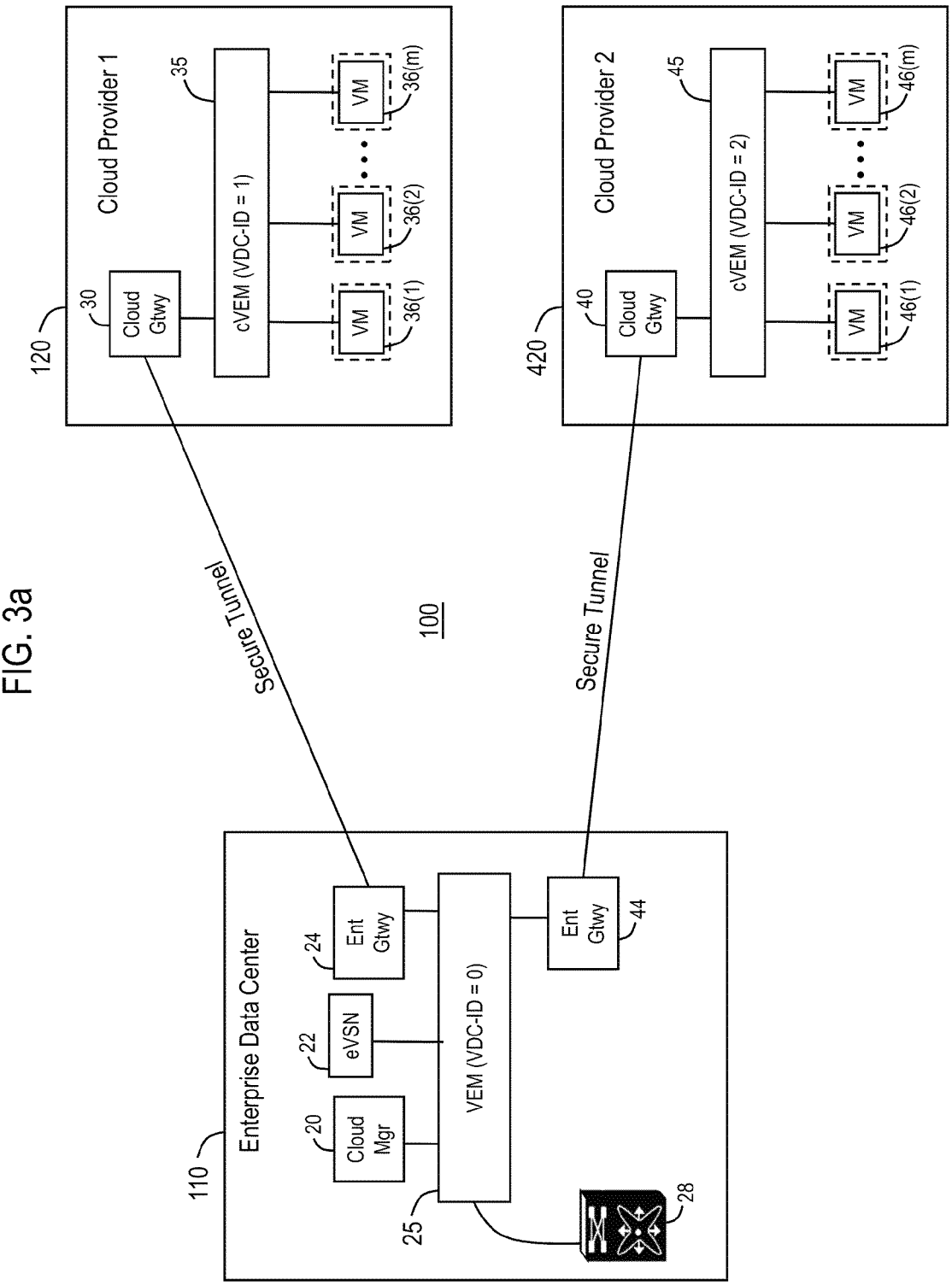

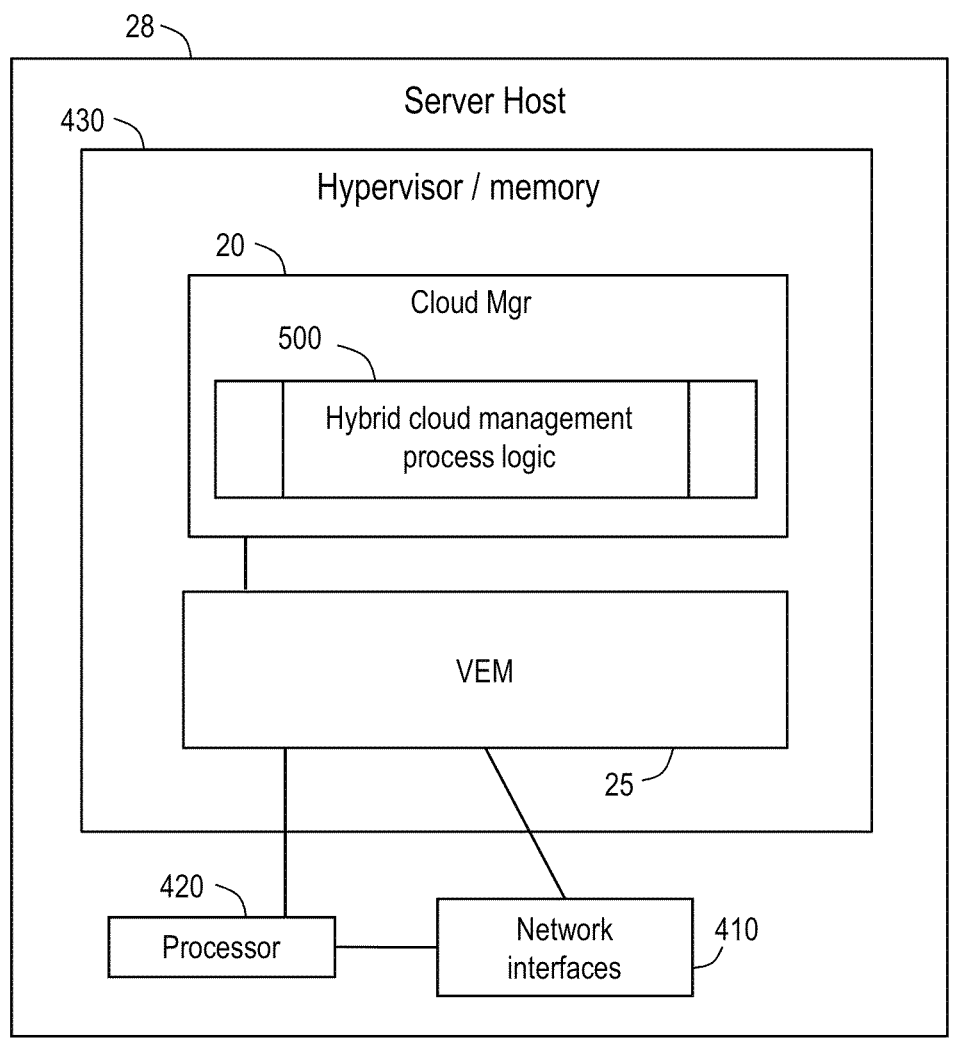

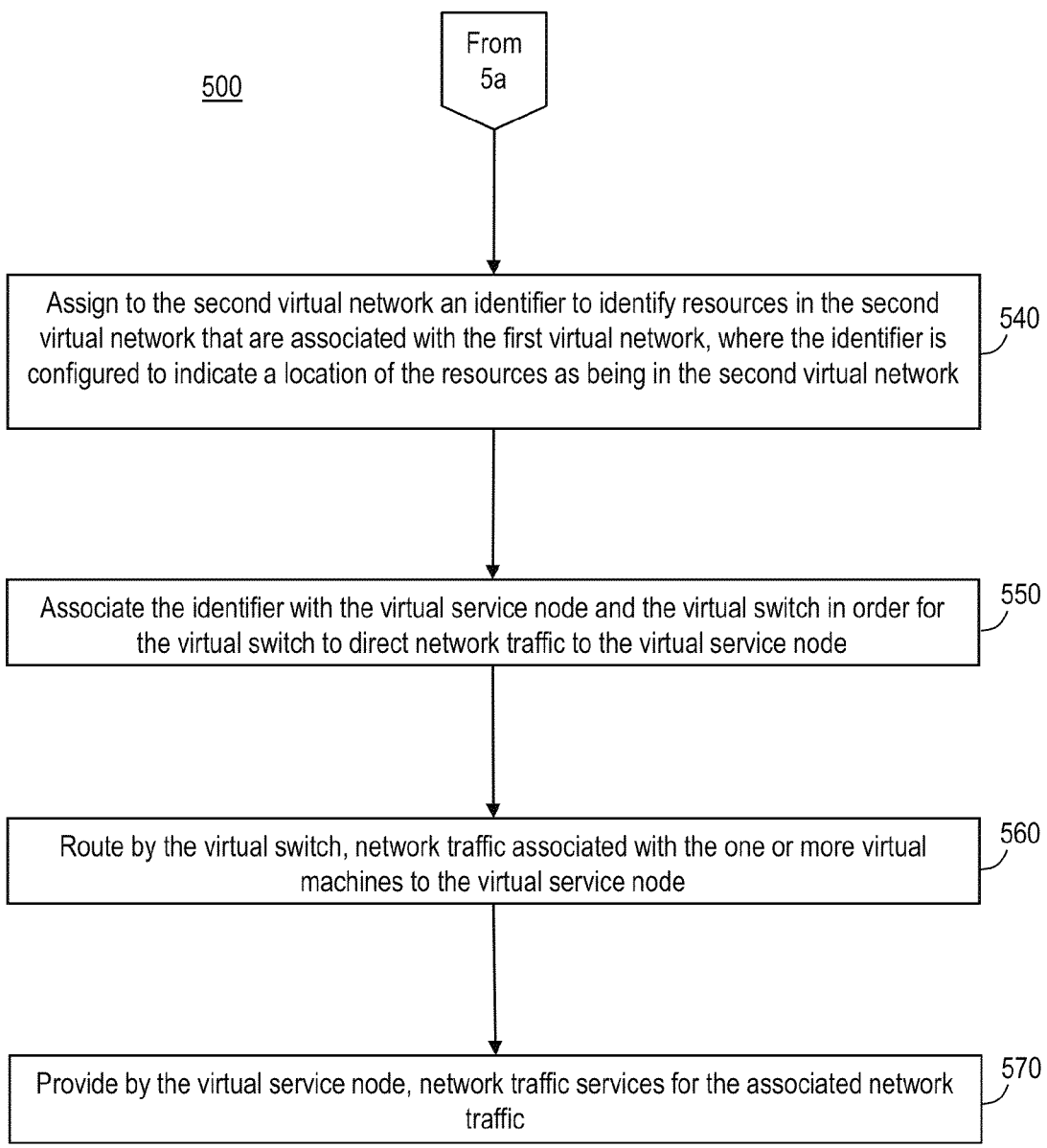

LOCATION AWARE VIRTUAL SERVICE PROVISIONING IN A HYBRID CLOUD ENVIRONMENT

TECHNICAL FIELD

The present disclosure relates to a provider data center in a hybrid cloud environment.

BACKGROUND

Data centers may host applications and store large amounts of data for an organization or multiple organizations. An enterprise data center or "cloud" may be privately owned and discretely provide services for a number of customers, with each customer using data center resources by way of private networks. In addition, these data centers provide server and desktop virtualization that is dramatically changing the enterprise network by creating many "virtual networks" which connect virtual machines and the physical networks through virtual switches.

When an enterprise data center starts to run out of capacity, the enterprise cloud operator may opt to buy more hardware, which permanently increases hardware and operational costs. Another solution for increasing capacity is to "borrow" or lease resources from a public cloud data center, thereby only temporarily increasing data center costs during the lease period. When the enterprise data center leases capacity from a public or cloud data center, the combination of the enterprise cloud and public cloud is referred to as a "hybrid" cloud. The hybrid cloud is achieved by way of an overlay network.

BRIEF DESCRIPTION OF THE DRAWINGS

FIG. 3a is an example block diagram of relevant portions of the network from FIG. 1 in which a second cloud data center is provided with location awareness using a virtual data center identifier according to the techniques described herein.

FIG. 4 is an example block diagram of a cloud network management device configured to manage DVS components within the hybrid cloud network according to the techniques described herein.

FIGS. 5a and 5b are flowcharts of a process for managing DVS components across a hybrid cloud network according to the techniques described herein.

DESCRIPTION OF EXAMPLE EMBODIMENTS

Overview

Techniques are provided to bring a "sense" of location (i.e., cloud location) to distributed virtual switch (DVS) components for service provisioning and reducing latency observed in conducting policy evaluations across a network, e.g., the Internet, in a hybrid cloud environment. A management application in a first virtual network subscribes to virtual network services provided by a second virtual network. A first message is sent to the second virtual network, the first message comprising information configured to start a virtual switch in the second virtual network to switch network traffic for one or more virtual machines in the second virtual network, wherein the one or more virtual machines in the second network are configured to extend services provided by the first virtual network into the second virtual network. A second message is sent to the second virtual network, the second message comprising information configured to start a virtual service node in the second virtual network that provides network traffic services for the one or more virtual machines.

Example Embodiments

Figure 1:
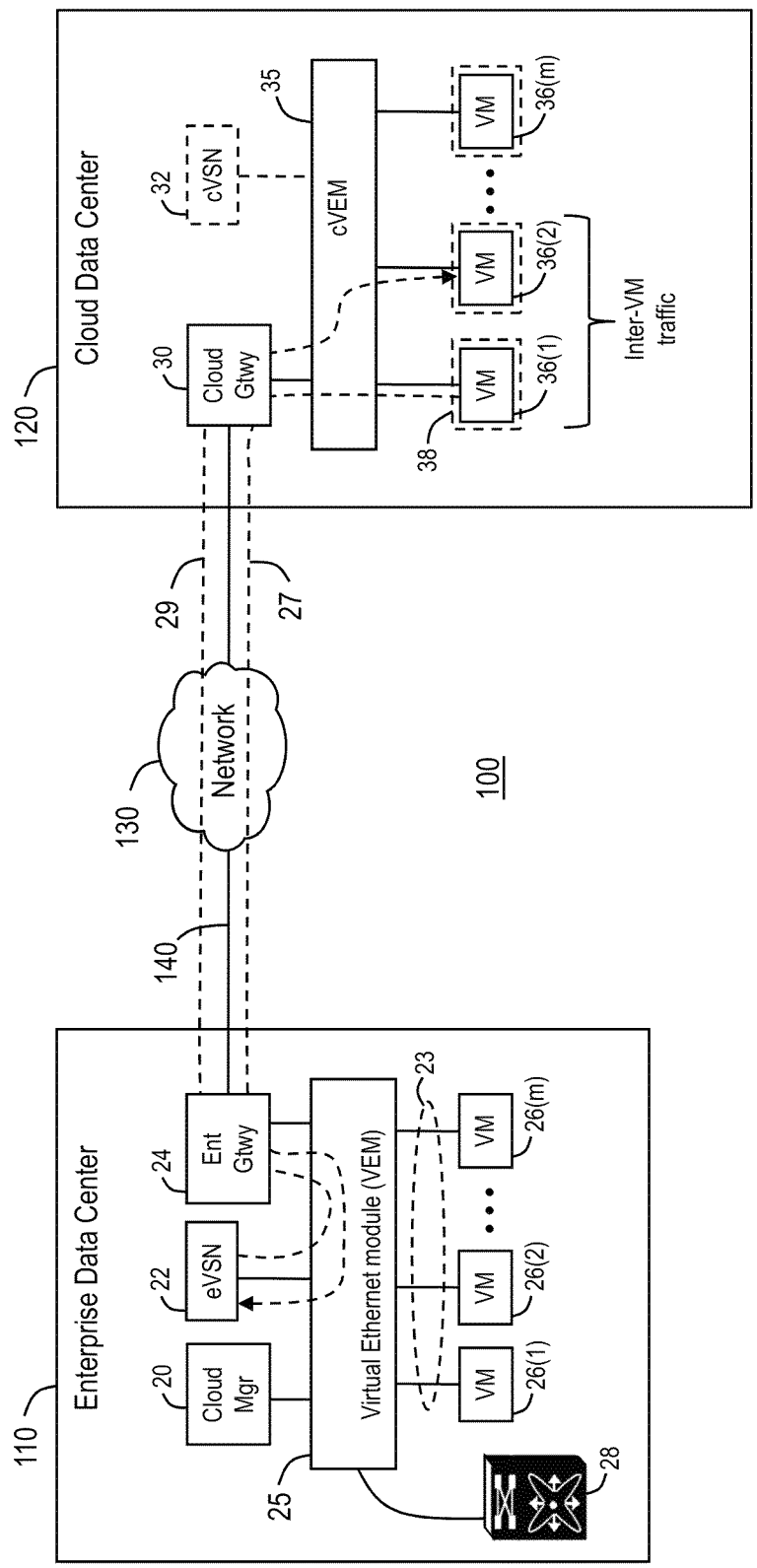
FIG. 1 is an example of a block diagram of a hybrid cloud network with an enterprise data center and a cloud data center that employ location awareness with respect to distributed virtual switch (DVS) components according to the techniques described herein.

Referring first to FIG. 1, an example hybrid cloud network or system 100 is shown for a hybrid data center environment. System 100 comprises an enterprise data center 110 and a cloud data center 120. The data centers 110 and 120 communicate with each other by way of link 140 over a network 130, e.g., the Internet or a virtual private network (VPN). The data center 110 employs a switch 28 for hosting hardware and software that form a distributed virtual switch (DVS) 25, using a component referred to herein as a Virtual Ethernet Module (VEM). The switch 28 may comprises a plurality of host devices, e.g., Hypervisors, and may host a virtual supervisor module (VSM). As shown in FIG. 1, the switch 28 hosts a cloud manager (CM) 20, an enterprise virtual service node (eVSN) 22, an enterprise gateway (Ent Gtwy) 24, and a plurality of virtual machines 26(1)-26(m) that may be configured by way of a port profile 23.

The cloud data center 120 hosts a cloud gateway 30 and a cloud VEM (cVEM) 35 that provides switching for a plurality of VMs 36(1)-36(m). Each VM in the cloud data center 120 has a shell component, referred to herein as a container or nested VM container, that provides a VM interface to the hardware in the cloud data center. The container is indicated by the dashed box surrounding each VM in the cloud data center, e.g., as shown at reference numeral 38. The VM container provides a way for the VM to access cloud data center 120 processing resources while protecting the cloud data center 120 from unauthorized access. In essence the VM shell is responsible for running the enterprise customer's VM as a guest VM, e.g., VMs 36(1)-36(m), and for providing a network overlay for connecting the guest VM to private networks in the enterprise, e.g., enterprise data center 110, via gateways 24 and 30. Any of the VMs 36(1)-36(m) may be started independently or migrated from data center 110 to data center 120 in order to better allocate resources across the hybrid cloud.

To further explain, an agreement is set up between the enterprise owner of data center 110 and the service provider for cloud data center 120, e.g., a service level agreement (SLA). The service provider for data center 120 may be in the business of leasing excess capacity to any entity that needs processing capacity. The SLA allows the enterprise data center to lease resources through a given service arrangement, e.g., pricing, resource allocation, cloud performance, etc.

To extend resources beyond the enterprise data center, the cloud manager 20 starts a cloud gateway, e.g., cloud gateway 30, using commands authorized by the cloud data center 120, e.g., by way of the SLA. Although not illustrated in FIG. 1, the cloud gateway 30 may have a shell component that acts as a processing resource access intermediary. The enterprise gateway 24, the cloud gateway 30, and the cVEM 35 form a base architecture for realizing the techniques described herein, and one that is supervised by the CM 20. This framework is not provided in conventional hybrid cloud environments.

Many traditional enterprise extensions into the cloud data center may use a network overlay technology, e.g., OpenVPN, to create an overlay network in the cloud data center for connecting cloud resources to the enterprise network. While offering secure transport connections in a cloud environment, OpenVPN does not provide a switch infrastructure and thus, lacks the ability to switch network traffic locally within the cloud data center, extend consistent enterprise network policies into the cloud data center, insert network services into the cloud data center, e.g., server load balancers, firewalls, etc., and construct a sophisticated network topology in the cloud data center, e.g., systems connected through a router and multiple Virtual Local Area Networks (VLANs).

The techniques described herein further introduce several management plane concepts. The first concept is the cloud manager, e.g., CM 20, that is a management platform that could be an application or a VM running anywhere in the enterprise. The cloud manager is responsible for providing the hybrid cloud operations, management of cloud resources, dynamic instantiating of cloud gateways and nested VM container components though the enterprise virtualization platform such as a VM manager (e.g., VMWare's vCenter) and cloud provider application interfaces (APIs), e.g. Amazon's Amazon Web Service (AWS) API. The cloud manager 20 also monitors health of all the components and provides high availability (HA) for those components. Thus, the cloud manager 20 implements hybrid cloud management process logic that encompasses the techniques described herein and is described with specific examples in connection with FIGS. 2, 3a, 3b, and 4, and more generally in connection with FIGS. 5a and 5b. The cloud manager 20 may provide a graphical user interface (GUI) for device and policy management with respect to hybrid cloud components, e.g. VMs, VSNs, and gateways.

The second management concept is the nested VM container within which the guest VM operates, "guest" referring to a guest with respect to the cloud data center. For example, in a nested virtualization environment running in the cloud data center, the inner most VM, i.e., the guest VM, is often "out of bounds" for the operator that provides the actual migration of services, e.g., the enterprise operator. As such, the out of bound condition makes it difficult for the enterprise operator to monitor the performance of the guest VM. In these cases, there exists a need to transparently collect data that provides a picture of the condition inside the VM, e.g., processor, storage, and memory utilization statistics, as well as fault detection.

Accordingly, a base architecture is created to provide for the automatic scaling and monitoring of components in a hybrid cloud environment. In a virtualized computing environment such as a modern virtualized data center and cloud service provider data center, many capacity planning tools and applications are available for a corporate Information Technology (IT) administrator to accurately allocate network resources on demand, i.e., to automatically scale resources to current need. The base architecture described herein allows the IT administrator to automatically perform switching, policy management, network services, and construct sophisticated networks in the cloud data center and within the framework of the base architecture and overlay networks. This technology is scalable both within the cloud data center and to multiple cloud data centers.

FIG. 1 partially illustrates the problems encountered in traditional overlay networks. First, in traditional overlay networks, cloud data center VMs are coupled directly to enterprise gateway 24 via network 130. Accordingly, any traffic, e.g., inter-VM (IVM) traffic, that requires services, e.g., firewall or Wide Area Application Services (WAAS) from a service node such as eVSN 22, needs to traverse network 130. This is illustrated for IVM traffic between VM 36(1) and 36(2). In this example, IVM traffic 27 from VM 36(1) is serviced by eVSN 22 and then routed as traffic 29 to VM 36(2), as shown. This network traversal clearly delays the traffic 27 and 29, thereby introducing undesirable and unnecessary network latency.

The addition of the cloud gateway, e.g., cloud gateway 30, and the virtual switching module, e.g., cVEM 35, alleviate network latency. The cloud gateway 30 mediates ingress and egress traffic for cVEM 35, while cVEM 35 provides virtual switching at the cloud data center 120. The cVEM 35 may be based on an extension of DVS technology, e.g., based on components used by Cisco's Nexus 1000V technology. Thus, the cloud VEM, e.g., cVEM 35, may play the role of a virtual line card for a distributed switch, e.g., a Nexus 1000V DVS. Multiple instances of cloud gateways and VEMs may be instantiated or started in the cloud data center(s). The introduction of cloud gateway 30 and CM 20 into system 100 allows CM 20 to start a service node in cloud data center 120, as shown at reference numeral 32 with dashed lines indicating that VSN 32 has not yet been started. The associated advantages of this arrangement will be described in connection with FIG. 2.

Figure 2:
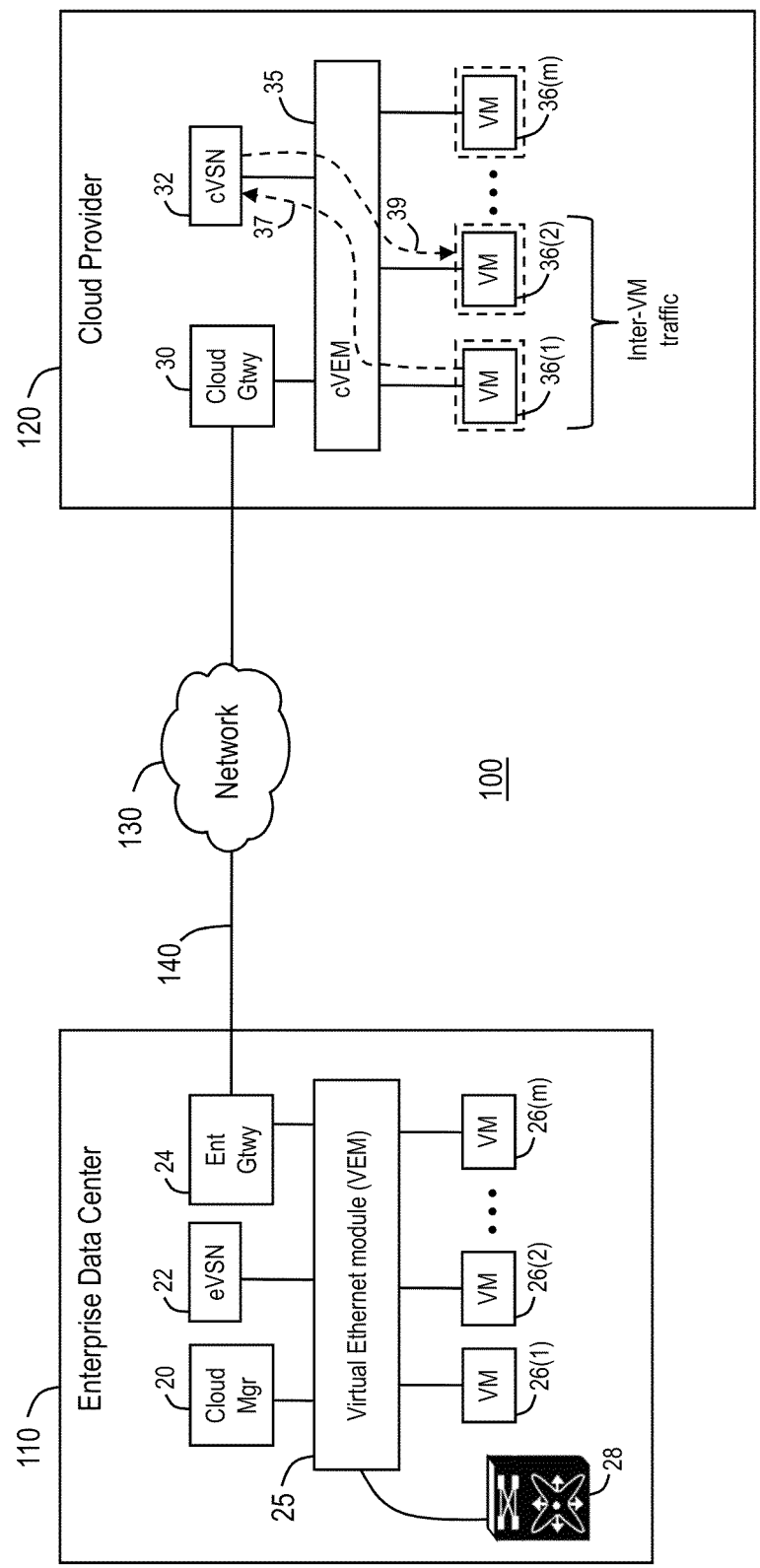
FIG. 2 is an example block diagram of the hybrid cloud network from FIG. 1 illustrating how location awareness reduces network latency according to the techniques described herein.

Referring now to FIG. 2, an example is shown of a block diagram of the hybrid cloud network 100 from FIG. 1 in which location awareness reduces network latency. In this example, the cVSN 32 has been fully started. The cVSN 32 may provide the same or other services as eVSN 22. In this regard, cVSN 32 can now provide IVM services for VMs 36(1) and 36(2). This concept is illustrated by traffic 37 being serviced and returned to VM 36(2) as traffic 39. The traffic 37 and 39 have a shorter "distance" to travel when compared to traffic 27 and 29 from FIG. 1, thereby reducing network latency. In the case of a firewall VSN, for example, it may be appreciated that traffic 37 may not be serviced, but dropped when that traffic does not meet security policy, and the cloud manager or other entity may be notified.

Referring to FIG. 3a, an example block diagram is shown of relevant portions of the network from FIG. 1 in which location awareness is provided using a virtual data center identifier. In this example, a second data center 420 is added to the hybrid cloud network that uses a different cloud provider, labeled Cloud Provider 2 when viewed in comparison to data center 120 run by Cloud Provider 1 in FIGS. 1 and 2. Data center 420 has a cloud gateway 40 and a cVEM 45 that provides switching for VMs 46(1)-46(m).

A concept of location awareness is introduced that facilitates processing across the hybrid cloud network 100. In conventional DVS environments, a DVS or VEMs may be distributed across several underlying hardware platforms, e.g., Hypervisors, in which the DVS operates without knowledge of the hardware. That is, the switch just performs its switching functions across the platforms as if it were one switch. However, to provide switching and other services in the hybrid cloud environment, provisioning of cloud components is facilitated by location awareness.

Each of the VEMs and potentially the associated DVS components, e.g., gateways or VMs, are associated with an identifier that identifies the location of the VEM instantiation, i.e., in which cloud does the VEM physically reside. The techniques provided herein allow providers (or users by demand) to dynamically instantiate a virtual switch VEM in the cloud data center to connect cloud VMs to the enterprise network over a secure Layer 2 network overlay. As mentioned above, it is a challenge to use the same VSN deployed in the enterprise network to protect or service the cloud VMs. Accordingly, the cloud manager allows IT administrators to extend enterprise networks to different cloud provider data centers and to connect resources allocated in the clouds to form a flexible and extensible hybrid cloud. In this regard, the cloud manager defines these cloud resources allocated in one cloud provider and connected to the hybrid cloud network as a Virtual Data Center (VDC).

Each of the VDCs is assigned an identifier (ID), namely a VDC-ID. Within an enterprise cloud, the VDC-ID is not only used for identifying the resources allocated in a specific cloud service provider, but also provides a sense of location for all the cVEM switch modules. In this example, VEM 25 is assigned a VCD-ID of zero, while cVEM 35 and cVEM 45 are assigned VDC-IDs of 1 and 2, respectively. When the cloud manager, e.g., CM 20, dynamically allocates cVEM modules and creates a network extension, each of the cVEM modules allocated within the same cloud data center is assigned with the same VDC-ID. For example, the VDC-ID assignments may be made by applying simple rules such as: by default, all traditional enterprise VEMs are assigned with a VDC-ID of value zero while cVEMs allocated for a specific cloud provider are assigned with a VDC-ID other than zero in order to identify cloud resources allocated within a specific provider data center. In the case of a provider that provides data centers in multiple locations, e.g., East coast and West coast, the VDC-ID may be the same for both data centers or different for each data center depending on the hybrid cloud implementation.

At this point, it may be helpful to contrast traditional provisioning models to a provisioning model enabled by the techniques described herein. Referring again to FIG. 1, the port profile, e.g., port profile 23, is described according to prior techniques. The process is as follows: VSN service profiles and policies, along with VSN IP address are configured at a management platform, e.g., a Virtual Network Management Center (VNMC) that manages individual VMs. The VNMC pushes the configured VSN service profiles and policies to each VSN (in this example only VSN 22). On a VSM of a traditional Nexus 1000V, the administrator configures the VSN service profile, e.g., VSN Internet Protocol (IP) address and VNMC IP address in a port profile, e.g., port profile 23. In other words, the administrator binds the VSN service profile with port profile and the VSM maps the VSN service profile name to a VSN service profile ID by communicating to the VNMC using an interface, e.g., a Representational State Transfer (REST) application interface (API).

Thus, when a new VM comes online (including a VSN), it gets attached to a port profile. In other words, the VSM identifies the port profiles bound to the VM's interfaces (e.g., virtual network interface card (vnic)) and identifies the corresponding VSN service profile, and the VSN associated with those port profiles. Then, the VSM updates a virtual service data path (VSDP) service classification tables within the VEM with a virtual Ethernet port (vEth), VSN service profile ID and VSN binding. After this part of the provisioning is complete, the VSDP tunnels any traffic originating from or destined to the given vEth port to the configured VSN. The VEMs may host the VSDP that provides a dedicated traffic pathway for services provided by VSNs. The VSDPs may be in the form of a service overlay, e.g., a layer 2/3 overlay tunnel. The VSDPs also give the VSNs mobility that allows them to migrate from one server to another without routing traffic through an inline service appliance.

The traditional provisioning can be summarized in the following two tables:

TABLE 1

Per Port Policy Table on a VEM

| vEth Index | Per Port Policy |
|---|---|
| 1 | VN-SP-ID, VSN Index, . . . |
| 2 | VN-SP-ID, VSN Index, . . . |

TABLE 2

VSN Table on a VEM

| VSN Index | VSN record |
|---|---|
| 1 | VSN-Name, VSN IP address, . . . |
| 2 | VSN-Name, VSN IP address, . . . |

As can be seen from Tables 1 and 2, Table 1 relates, among other things, a VEM vEth port (index or ID) to a per port policy comprising a VSN service profile ID (VN-SP-ID) and a VSN Index that is used as an entry to Table 2. Table 2 further relates, among other things, the VSN Index to a VSN name and IP address. The VSN IP address is ultimately used to route VM traffic to the appropriate VSN for servicing, i.e., the VM's vEth provides the entry to Table 1. For example, a VM may have a vEth of 1 which points to a VSN index of 2, which in turn, points to a VSN, e.g., eVSN 22. Thus, according to traditional bindings, a VM in the cloud data center is bound to a VSN in the enterprise data center and would not be able to locate entities, e.g., VSNs, in the cloud. Tables 1 and 2 may be database tables or other data structures convenient to hold or represent the underlying mappings.

Although not shown in the various figures, the VNMC may be maintained as a separate entity specific to enterprise VMs and that operates in cooperation with the cloud manager, e.g., CM 20. Alternatively, the VNMC functionality may be incorporated within the cloud manager and together they operate as a single entity. In other words, the cloud manager may be configured to manage all binding and database tables or data structures across the entire hybrid cloud network.

Referring again to FIG. 3a, an additional table is introduced in order to describe VDC-ID mapping:

TABLE 3

VEM to VDC Assignment

| VEM Name | VDC-ID | VEM Location |
|---|---|---|
| Default | 0 | Within the Enterprise |
| cVEM 1 | 1 | Cloud provider 1 |
| cVEM 2 | 2 | Cloud provider 2 |

As can be seen from Table 3, the VEM assignment provides a location of a VEM in a particular data center. Thus, when the cloud manager provides the particular bindings for a VM (including a VSN or gateway), the cloud manager can provide a location-based binding using the appropriate IP address, names, IDs, etc. Further operations associated with Table 3 will be described in connection with FIG. 3b.

Figure 3B:
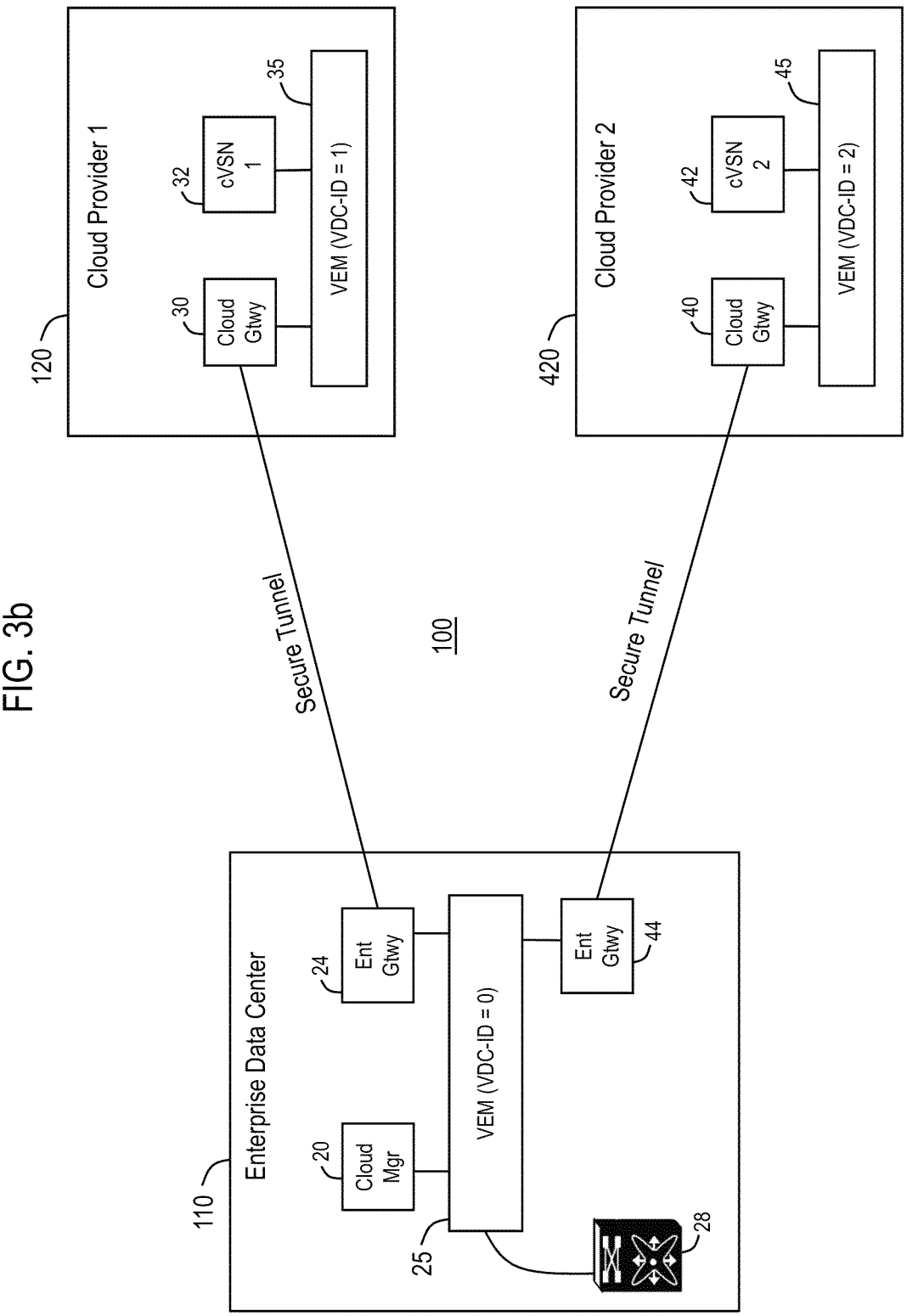
FIG. 3b is an example block diagram of relevant portions of the network from FIG. 3a in which virtual service nodes are deployed with location awareness according to the techniques described herein.

Turning to FIG. 3b, an example diagram of relevant portions of the network from FIG. 1 is shown in which virtual service nodes are deployed with location awareness. As described above, provisioning virtual services in the cloud data center reduces the latency in service policy evaluation.

Furthermore, the cloud manager provides a mechanism to group resources allocated from the same cloud provider to form a VDC, as mentioned above. By combining these two approaches, the architecture described herein can provide a location-aware virtual service provisioning model.

As shown in FIG. 3b, cVSN 32 from FIG. 2 is shown as well as a cVSN 42 that has been instantiated in data center 420. When a new VSN is installed and provisioned at a specific cloud provider through a VDC management function by CM 20, the CM 20 may bind the VSN with a specific VDC. This binding implies that the resources allocated within the VDC would be provisioned according to the newly installed VSN. As a part of processing, the relevant configuration of a given VSN will be distributed to all the cVEMs which belong to the same VDC. Thereafter, when the cVEM "sees" network traffic issued by cloud resources of a given VDC, the cVEM can redirect the network traffic to the VSN that was previously provisioned.

The following two tables illustrate this location-aware virtual service provisioning model:

TABLE 4

Per Port Policy Table on a cVEM

| vEth Index | cVEM Per Port Policy |
|---|---|
| 1 | VN-SP-ID, VSN Index, . . . |
| 2 | VN-SP-ID, VSN Index, . . . |

TABLE 5

Per cVEM VSN Table for a given VDC

| VSN Index | VSN record |
|---|---|
| 1 | VSN-Name, VSN IP address, . . . |
| 2 | VSN-Name, VSN IP address, . . . |

Note that Tables 4 and 5 appear almost identical to Tables 1 and 2. However, these tables are maintained by a cVEM on the cloud data center and were created via cloud manager operations in the enterprise data center by way of data contained in Table 3. Table 4 relates, among other things, a VEM vEth port (index or ID) to a per port policy comprising a VSN service profile ID (VN-SP-ID) and a VSN Index that is used as an entry to Table 5. Table 5 further relates, among other things, the VSN Index to a VSN name and IP address used within a given cloud data center. The VSN IP address is ultimately used to route VM traffic to the appropriate cVSN for servicing, i.e., the cloud VM's vEth provides the entry to Table 4. For example, a VM may have a vEth of 1 which points to a VSN index of 2, which in turn, points to a cloud VSN, e.g., cVSN 32 or 42. Thus, a VM in the cloud data center is bound to a VSN in the corresponding cloud data center and therefore receives traffic services from VSNs, in the cloud. Tables 4 and 5 may be database tables or other data structures convenient to hold or represent the underlying mappings.

Accordingly, with multiple VSNs deployed in the hybrid cloud depicted in FIG. 3b, the traffic service evaluation duty can be split using the following example rules: 1) an eVSN is used for provisioning services for network traffic exchanged among VM resources in the enterprise; 2) a first cloud VSN (e.g., cVSN 32) is used for provisioning services for network traffic exchanged among VM resources in VDC 1; 3) a second cloud VSN (e.g., cVSN 42) is used for provisioning services for network traffic exchanged among VM resources in the VDC 2; and 4) for each of any two given data centers (e.g., enterprise 110 and VDC 1 120), the VSNs deployed in both data centers are used for provisioning services to the inter-data center network traffic, e.g., between VM 26(1) and 36(1) as shown in FIG. 2. In another example, services provided by a VSN in one data center may be tagged as such in order to reduce duplicated VSN traffic services, e.g., inter-data center network traffic may be assigned to a single VSN in the enterprise data center or in the cloud data center.

The example operations of the base architecture presented above are not meant to be limiting, but are provided to illustrate the flexibility of the base architecture that traditional architectures, e.g., OpenVPN, are not able to accommodate. By way of example and although not completely described herein, sophisticated network topologies may be constructed by one skilled in hybrid cloud networks using the techniques described herein. Further, there are other components in system 100 such as mass storage, core and edge switches, and in switch 28, e.g., Hypervisors and line cards, as one ordinary skill in the art would appreciate, but for simplicity, those components are omitted in FIGS. 1-3b.

Referring now to FIG. 4, an example of a processing or server device that may host a cloud manager, e.g., switch 28 hosting cloud manager 20, is shown. The device 28 comprises a network interface module or unit 410, a processor 420, and a memory 430. The memory stores instructions for hybrid cloud management process logic 500. Briefly, the hybrid cloud management process logic 500 is configured to cause the processor in the device 28 to dynamically manage hybrid cloud components as described herein.

The network interface device 410 is configured to enable communications over a network, e.g., network 130 from FIG. 1 and various networks internal to the data centers in the hybrid cloud, to, among other things, manage hybrid cloud components in hybrid cloud network 100. Processor 420 is coupled to the network interface device 410 and to memory 430. Processor 420 is, for example, a microprocessor or microcontroller that is configured to execute program logic instructions (i.e., software) for carrying out various operations and tasks described herein. For example, the processor 420 is configured to execute hybrid cloud management process logic 500 that comprises processor executable software instructions stored in memory 430, in order to manage hybrid cloud components. The functions of processor 420 may be implemented by instructions encoded in one or more tangible computer readable media (e.g., embedded logic such as an application specific integrated circuit, digital signal processor instructions, software that is executed by a processor, etc.), wherein memory 430 stores data used for the operations described herein and stores software or processor executable instructions that are executed to carry out the operations described herein.

Memory 430 may comprise read only memory (ROM), random access memory (RAM), magnetic disk storage media devices, optical storage media devices, flash memory devices, electrical, optical, or other physical/tangible memory storage devices. Thus, in general, the memory 430 may comprise one or more tangible (non-transitory) computer readable storage media (e.g., a memory device) encoded with software comprising computer executable instructions and when the software is executed (by the processor 420) it is operable (or causes the processor) to perform the operations described herein in connection with hybrid cloud management process logic 500.

Figure 5A:
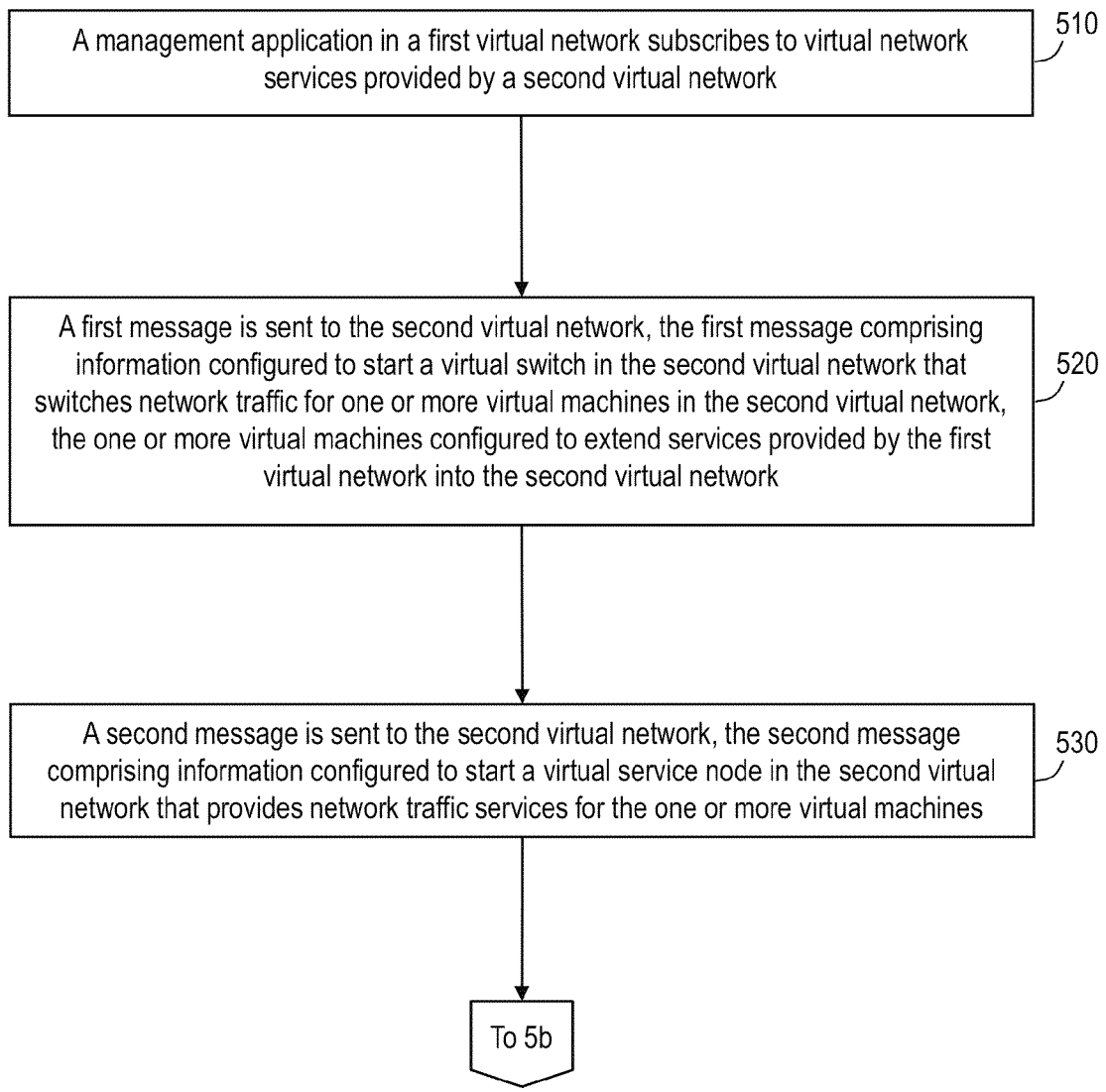

Referring to FIGS. 5a and 5b, flowcharts are now described for depict operations of the process logic 500 for management of enterprise data center components in the hybrid cloud. At 510, a management application in a first virtual network subscribes to virtual network services provided by a second virtual network. At 520, a first message is sent to the second virtual network, the first message comprising information configured to start a virtual switch in the second virtual network that switches network traffic for one or more virtual machines in the second virtual network, where the one or more virtual machines are configured to extend services provided by the first virtual network into the second virtual network. At 530, a second message is sent to the second virtual network, the second message comprising information configured to start a virtual service node in the second virtual network that provides network traffic services for the one or more virtual machines.

At 540, an identifier is assigned to the second virtual network to identify resources in the second virtual network that are associated with the first virtual network, where the identifier is configured to indicate a location of the resources as being in the second virtual network. At 550, the identifier is associated with the virtual service node and the virtual switch in order for the virtual switch to direct network traffic to the virtual service node. At 560, the virtual switch routes network traffic associated with the one or more virtual machines to the virtual service node, and at 570, the virtual service node provides network traffic services for the associated network traffic.

These techniques further involve defining and storing information representing a plurality of service policies; and defining and storing information representing a plurality service profiles comprising one or more identifiers for corresponding service policies for one or more virtual service nodes configured to provide network traffic services. Information may be generated that represents a port profile comprising one or more service profile identifiers and an identifier for the virtual service node, thereby assigning one or more service profiles to the port profile. A virtual network port may be assigned to a virtual machine running in the second virtual network and the port profile may be associated with the virtual network port. The virtual switch network routes traffic associated with the virtual machine to the virtual service node based on the virtual service node identifier.

In summary, the techniques described create a "sense" of location (i.e., cloud location) to DVS components for service provisioning and to reduce latency observed in conducting policy evaluations across a network, e.g., the Internet, in a hybrid cloud environment.

These techniques offer several advantages over conventional hybrid clouds, including: 1) provisioning virtual services in the cloud to reduce service policy evaluation latency; 2) maintaining compatibility of the service provisioning approach with current DVS architectures as well as current and future DVS features such as service node chaining and clustering, and 3) providing for resource management using the locations of cloud resources. The location sense of cloud resources can further be used for provisioning various virtual services such as Virtual Security Gateways (VSGs), vWAAS, and Adaptive Security Appliances (ASAs) for a specific set of cloud resources.

The above description is intended by way of example only.

What is claimed is:

1. A method comprising:
    at a management application in a first virtual network comprising a first virtual service node, subscribing to virtual network services provided by a second virtual network;
    sending to the second virtual network a first message comprising information configured to start a virtual switch in the second virtual network that switches network traffic for one or more virtual machines in the second virtual network that are configured to extend services provided by the first virtual network into the second virtual network; and
    sending to the second virtual network a second message comprising information configured to start a second virtual service node in the second virtual network to provide decentralized policy-based virtual network traffic services to direct network traffic between the one or more virtual machines within the second virtual network based on service profile identifiers of service profiles having corresponding service policies.

2. The method of claim 1, further comprising assigning to the second virtual network an identifier configured to identify resources in the second virtual network that are associated with the first virtual network.

3. The method of claim 2, wherein the identifier is configured to indicate a location of the resources as being in the second virtual network.

4. The method of claim 2, further comprising associating the identifier with the second virtual service node and the virtual switch in order for the virtual switch to direct network traffic to the second virtual service node.

5. The method of claim 1, further comprising:
    routing by the virtual switch network traffic associated with the one or more virtual machines to the second virtual service node; and
    providing by the second virtual service node network traffic services for the associated network traffic.

6. The method of claim 1, further comprising:
    defining and storing information representing the service policies; and
    defining and storing information representing a plurality the service profiles comprising one or more identifiers for corresponding service policies for one or more virtual service nodes configured to provide the network traffic services.

7. The method of claim 6, further comprising:
    generating information representing a port profile comprising one or more service profile identifiers and an identifier for the second virtual service node, thereby assigning one or more service profiles to the port profile.

8. The method of claim 7, further comprising:
    assigning a virtual network port to a virtual machine running in the second virtual network;
    associating the port profile with the virtual network port; and
    routing, by the virtual switch, network traffic associated with the virtual machine to the second virtual service node based on the virtual service node identifier.

9. The method of claim 1, wherein the decentralized policy-based virtual network traffic services comprise firewall services and wide area application services.

10. An apparatus comprising:
    one or more network interfaces configured to interface with a first virtual network comprising a first virtual service node; and
    a processor coupled to the one or more network interfaces, and configured to:
        subscribe to virtual network services provided by a second virtual network;
        send to the second virtual network a first message comprising information configured to start a virtual switch in the second virtual network that switches network traffic for one or more virtual machines in the second virtual network that are configured to extend services provided by the first virtual network into the second virtual network; and send to the second virtual network a second message comprising information configured to start a second virtual service node in the second virtual network that provides decentralized policy-based virtual network traffic services to direct network traffic between the one or more virtual machines within the second virtual network based on service profile identifiers of service profiles having corresponding service policies.

11. The apparatus of claim 10, wherein the processor is further configured to assign to the second virtual network an identifier to identify resources in the second virtual network that are associated with the first virtual network, wherein the identifier is configured to indicate a location of the resources as being in the second virtual network.

12. The apparatus of claim 11, wherein the processor is further configured to associate the identifier with the second virtual service node and the virtual switch in order for the virtual switch to direct network traffic to the second virtual service node.

13. The apparatus of claim 10, wherein the processor is further configured to:
define and store information representing the service policies; and
define and store information representing the service profiles comprising one or more identifiers for corresponding service policies for one or more virtual service nodes configured to provide the network traffic services.

14. The apparatus of claim 13, wherein the processor is further configured to generate information representing a port profile comprising one or more service profile identifiers and an identifier for the second virtual service node which assigns one or more service profiles to the port profile.

15. The apparatus of claim 14, wherein the processor is further configured to:
assign a virtual network port to a virtual machine running in the second virtual network; and
associate the port profile with the virtual network port in order for the virtual switch to route network traffic associated with the virtual machine to the second virtual service node based on the virtual service node identifier.

16. The apparatus of claim 10, wherein the decentralized policy-based virtual network traffic services comprise firewall services and wide area application services.

17. One or more non-transitory computer readable storage media storing instructions that, when executed by a processor, cause the processor to:
subscribe by a first virtual network comprising a first virtual service node to virtual network services provided by a second virtual network;
send to the second virtual network a first message comprising information configured to start a virtual switch in the second virtual network that switches network traffic for one or more virtual machines in the second virtual network that are configured to extend services provided by the first virtual network into the second virtual network; and
send to the second virtual network a second message comprising information configured to start a second virtual service node in the second virtual network that provides decentralized policy-based virtual network traffic services to direct network traffic between the one or more virtual machines within the second virtual network based on service profile identifiers of service profiles having corresponding service policies.

18. The non-transitory computer readable storage media of claim 17, further comprising instructions that, when executed by a processor, cause the processor to assign to the second virtual network an identifier configured to identify resources in the second virtual network that are associated with the first virtual network, wherein the identifier is configured to indicate a location of the resources as being in the second virtual network.

19. The non-transitory computer readable storage media of claim 18, further comprising instructions that, when executed by a processor, cause the processor to associate the identifier with the second virtual service node and the virtual switch in order for the virtual switch to direct network traffic to the virtual service node.

20. The non-transitory computer readable storage media of claim 17, further comprising instructions that, when executed by a processor, cause the processor to:
define and store information representing the service policies; and
define and store information representing the service profiles comprising one or more identifiers for corresponding service policies for one or more virtual service nodes configured to provide the network traffic services.

21. The non-transitory computer readable storage media of claim 17, further comprising instructions that, when executed by a processor, cause the processor to generate information representing a port profile comprising one or more service profile identifiers and an identifier for the second virtual service node, thereby assigning one or more service profiles to the port profile.

22. The non-transitory computer readable storage media of claim 21, further comprising instructions that, when executed by a processor, cause the processor to:
assign a virtual network port to a virtual machine running in the second virtual network; and
associate the port profile with the virtual network port in order for the virtual switch to route network traffic associated with the virtual machine to the second virtual service node based on the virtual service node identifier.

23. The non-transitory computer readable storage media of claim 17, wherein the decentralized policy-based virtual network traffic services comprise firewall services and wide area application services.

* * * * *

UNITED STATES PATENT AND TRADEMARK OFFICE
CERTIFICATE OF CORRECTION

PATENT NO. : 9,313,048 B2
APPLICATION NO. : 13/438861
DATED : April 12, 2016
INVENTOR(S) : David Chang et al.

Page 1 of 1

It is certified that error appears in the above-identified patent and that said Letters Patent is hereby corrected as shown below:

In the claims,

In Col. 10, line 32, delete "a plurality".

Signed and Sealed this
Fourteenth Day of June, 2016

Michelle K. Lee
*Director of the United States Patent and Trademark Office*